United States Patent
Song et al.

(10) Patent No.: US 9,571,172 B2
(45) Date of Patent: Feb. 14, 2017

(54) METHOD OF MAXIMIZING MIMO THROUGHPUT BY PLACING ANTENNAS IN A VEHICLE

(71) Applicant: GM GLOBAL TECHNOLOGY OPERATIONS LLC, Detroit, MI (US)

(72) Inventors: Hyok Jae Song, Oak Park, CA (US); Arthur Bekaryan, Northridge, CA (US); James H. Schaffner, Chatsworth, CA (US); Eray Yasan, Canton, MI (US); Duane S. Carper, Davison, MI (US); Timothy J. Talty, Beverly Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/790,312

(22) Filed: Jul. 2, 2015

(65) Prior Publication Data

US 2016/0013839 A1    Jan. 14, 2016

Related U.S. Application Data

(60) Provisional application No. 62/023,349, filed on Jul. 11, 2014.

(51) Int. Cl.
| H03K 9/00 | (2006.01) |
| H04L 27/00 | (2006.01) |
| H04B 7/04 | (2006.01) |
| H04B 7/08 | (2006.01) |
| H04L 25/03 | (2006.01) |

(52) U.S. Cl.
CPC .............. *H04B 7/0413* (2013.01); *H04B 7/08* (2013.01); *H04L 2025/03426* (2013.01)

(58) Field of Classification Search
CPC ........... H04B 7/0413; H04B 1/06; H04B 7/08; H04B 1/3822; H04L 2025/03426
See application file for complete search history.

(56) References Cited

U.S. PATENT DOCUMENTS

| 2008/0037669 A1* | 2/2008 | Pan ...................... H04B 7/0417 375/260 |
| 2009/0051607 A1* | 2/2009 | Ellinger ................. B60N 2/002 343/711 |
| 2009/0196372 A1* | 8/2009 | Zhang .................. H04B 7/0417 375/267 |
| 2010/0225547 A1* | 9/2010 | Lan ....................... H01Q 1/3283 343/713 |

(Continued)

*Primary Examiner* — Erin File
(74) *Attorney, Agent, or Firm* — John A. Miller; Miller IP Group, PLC

(57) ABSTRACT

An arrangement of MIMO antennas in a vehicle, such as an automobile, where at least one of the MIMO antennas is placed inside the vehicle in the richer multipath signal propagation environment. The MIMO antennas will include a primary MIMO antenna that may also be used for non-4G cellular services and one or more secondary MIMO antennas that are used only for 4G cellular services. In one embodiment, the primary MIMO antenna is mounted to a roof of the vehicle in a module including other antennas and the one or more secondary antennas are positioned at desired locations within the vehicle. In another embodiment, the primary MIMO antenna and the one or more secondary MIMO antennas are all positioned within the vehicle.

20 Claims, 2 Drawing Sheets

(56) References Cited

U.S. PATENT DOCUMENTS

| | | | | |
|---|---|---|---|---|
| 2012/0033718 A1* | 2/2012 | Kauffman | ............ | H04B 1/3822 375/222 |
| 2014/0043204 A1* | 2/2014 | Basnayake | ........... | H01Q 1/3275 343/872 |
| 2014/0347247 A1* | 11/2014 | Park | ................... | H01Q 21/0075 343/893 |

* cited by examiner

METHOD OF MAXIMIZING MIMO THROUGHPUT BY PLACING ANTENNAS IN A VEHICLE

CROSS-REFERENCE TO RELATED APPLICATIONS

This application claims the benefit of the priority date of U.S. Provisional Patent Application Ser. No. 62/023,349, titled, Method of Maximizing MIMO Throughput by Placing Antennas in a Vehicle, filed Jul. 11, 2014.

BACKGROUND OF THE INVENTION

Field of the Invention

This invention relates generally to an arrangement of antennas in a vehicle and, more particularly, to an arrangement of multiple-input multiple-output (MIMO) antennas that provide 4G mobile communications services within a vehicle, such as an automobile.

Discussion of the Related Art

The current state of the art for mobile cellular wireless communications technology is known as 4G, which provides a greater data throughput and bandwidth than previous cellular communications technologies, such as 2G and 3G. The 4G cellular technology employs MIMO antennas at the transmitter and the receiver that provide an increase in the number of signal paths between the transmitter and the receiver, including multipath reflections off of various objects between the transmitter and the receiver, which allows for the greater data throughput. As long as the receiver can decouple the data being received on each path at the MIMO antennas where the signals are uncorrelated, then those paths can be used by the receiver to decipher data transmitted at the same frequency and at the same time. Thus, more data can be compressed into the same frequency providing higher bandwidth.

Modern vehicles employ various and many types of antennas to receive and transmit signals for different communications systems, such as terrestrial radio (AM/FM), cellular telephone, satellite radio, dedicated short range communications (DSRC), GPS, etc. Often the antennas used for these systems are integrated in a common antenna structure that is mounted to a roof of the vehicle so as to provide maximum reception capabilities.

Automobile manufacturers are looking to provide 4G cellular technology in vehicles, which presents a number of design challenges especially if the MIMO antennas are incorporated as part of the common antenna structure mounted to the roof of the vehicle. For example, by housing the MIMO antennas, which include at least two antennas, in the traditional telematics antenna module mounted to the roof of the vehicle, the entire antenna volume of the module would need to increase because of the extra real estate required for the MIMO antennas, which require a low correlation of the received signals at the antennas. In other words, because the signals received by the MIMO antennas need to be significantly uncorrelated, the distance between the antennas needs to be some minimum distance depending on the frequency band employed. Due to the increased size and volume of the antenna module, the required packaging for the MIMO antennas may no longer meet the styling and other requirements of the vehicle.

SUMMARY OF THE INVENTION

The present disclosure describes an arrangement of MIMO antennas in a vehicle, such as an automobile, where at least one of the MIMO antennas is placed inside the vehicle in a richer multipath signal propagation environment. The MIMO antennas will include a primary MIMO antenna that may also be used for non-4G cellular services and one or more secondary MIMO antennas that are used only for 4G cellular services. In one embodiment, the primary MIMO antenna is mounted to a roof of the vehicle in a module including other antennas and the one or more secondary MIMO antennas are positioned at desired locations within the vehicle. In another embodiment, the primary MIMO antenna and the one or more secondary MIMO antennas are all positioned within the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for arranging one or more MIMO antennas in a vehicle is merely exemplary in nature, and is in no way intended to limit the invention or its applications or uses. For example, the discussion below refers to the vehicle as being an automobile. However, as well be appreciated by those skilled in the art, the vehicle can be other vehicles such as trains, airplanes, etc.

Figure 1:
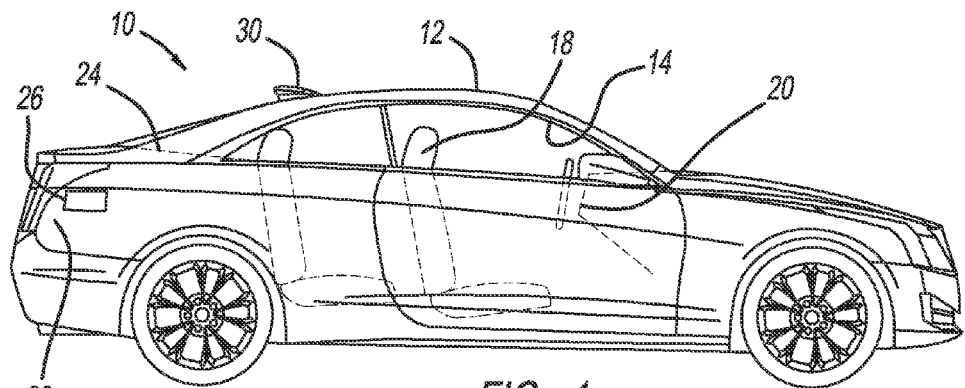
FIG. 1 is a side-view illustration of a vehicle including a known shark-fin roof mounted antenna module.

FIG. 1 is a side-view illustration of a vehicle 10 including a vehicle roof 12 under which is positioned a roof liner 14. The vehicle 10 also includes seats 18, an instrument panel 20, a trunk 22 and a rear package shelf 24. The vehicle 10 further includes a receiver 26 that is intended to represent a suitable receiver for the operation of any or all of the communications systems associated with the antennas discussed herein. As would be well understood by those skilled in the art, each of the antennas discussed herein would be in electrical communication with the receiver 26.

Figure 2:
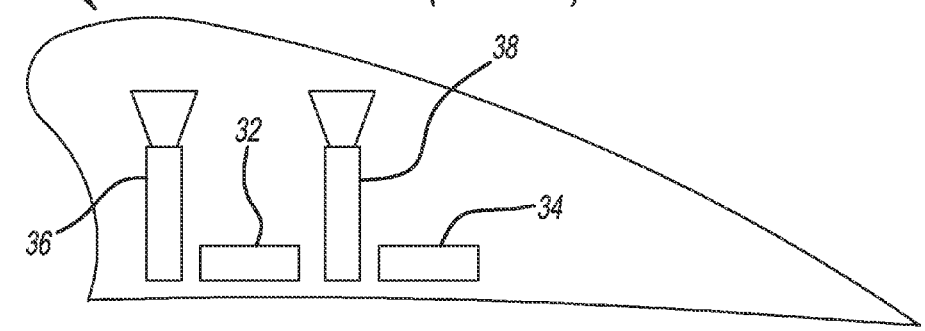
FIG. 2 is a side view illustration of the shark-fin antenna module shown in FIG. 1 separated from the vehicle.

The vehicle 10 also includes a known "shark-fin" roof mounted antenna module 30 shown separated from the vehicle 10 in FIG. 2. The antenna module 30 includes a number of antennas 32 and 34 depending on the particular vehicle that may include one or more of a dedicated short range communications (DSRC) antenna, AM/FM radio antennas, a satellite radio antenna, a GPS antenna, etc. The module 30 also includes at least two MIMO antennas 36 and 38 that provide 4G wireless cellular communications, as discussed above. It is noted that because the antenna module 30 requires at least two MIMO antennas that need to be spaced some distance apart so that the signals received by the antennas 36 and 38 are significantly uncorrelated, the size of the module 30 is increased over the previous shark-fin antenna modules that did not employ MIMO antennas.

Typically, MIMO antennas include a primary antenna and a secondary antenna, where the primary antenna may provide the 2G/3G wireless services and is also one of the MIMO antennas that provide the 4G service. Thus, for vehicular applications, the MIMO technology requires the user equipment to include at least two MIMO antennas available to serve as the primary and secondary antennas. Generally, both the primary and secondary antennas are used for receiving downlink signals, however, the uplink transmission is provided by only the primary antenna. Because, the legacy 2G/3G wireless services do not support the MIMO protocol, only one antenna is required to support the 2G/3G services. It is noted that the desired propagation channel requirements for MIMO antennas is opposite to that for non-MIMO cellular services in that the MIMO antenna based cellular services require rich multipath signal channels as opposed to non-MIMO supported cellular services.

The present invention proposes removing at least one of the MIMO antennas traditionally mounted on the roof of the vehicle in the module 30 to the inside of the vehicle to take advantage of the richer multipath signal propagation environment present inside of the vehicle as a result of signal reflections off of metallic structures within the vehicle. As will be discussed in detail below, in one embodiment, all of the MIMO antennas for the 4G wireless communication services are placed within the vehicle at selective locations certain distances apart to improve 4G performance. In another embodiment, one of the two or more antennas remains on top of the vehicle, such as in the traditional shark-fin antenna module, which can be used as the primary MIMO antenna for 4G communications services and provide the 2G/3G services. The other one or more MIMO antennas are placed within the vehicle at a suitable location to provide enhanced performance for the 4G communications services.

In the absence of significant multipaths, which is the case when both the primary and secondary MIMO antennas are placed on the roof of the vehicle, the eigenvalues of the channel matrix become heavily skewed toward a single dominant eigenvalue, which can be measured by the channel condition number, which is the ratio of maximum to minimum singular values of the channel matrix. The channel condition number is close to 1 if the channel matrix is well conditioned. The smaller the condition number, the better the channel condition for MIMO performance. The channel condition numbers obtained from the measured channel matrices for different cases show that by placing the MIMO antennas inside of the vehicle the channel condition for MIMO performance is better, i.e., a smaller condition number, than the state of the art practice of placing both MIMO antennas outside of the vehicle. By placing the secondary MIMO antenna inside the vehicle, the total radiation efficiency of the antenna is also improved because mutual coupling from and to the primary antenna is minimized due to an increase in spatial separation. The advantage of the proposed method is clear in terms of the channel condition and the antenna efficiency when compared to the case of placing two MIMO antennas on the vehicle roof.

Figure 3:
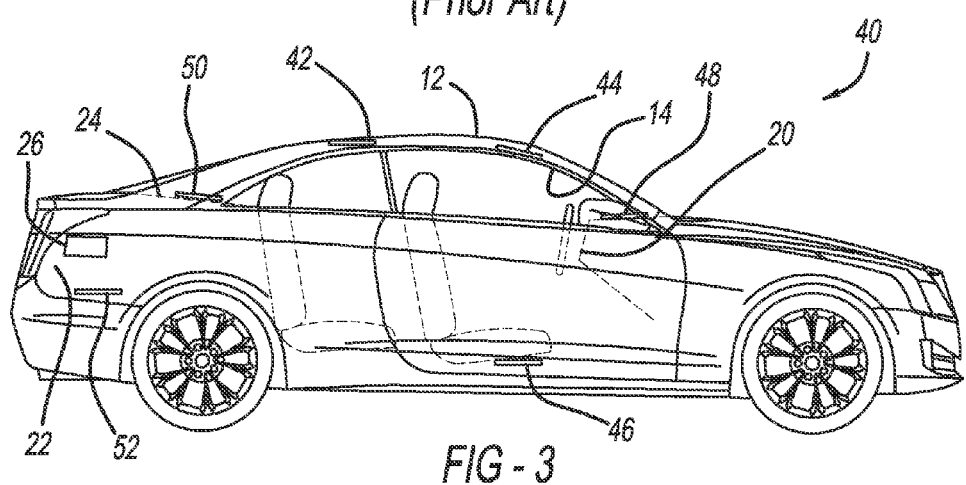
FIG. 3 is a side-view illustration of a vehicle including MIMO antennas within the vehicle.

FIG. 3 is a side-view illustration of a vehicle 40 similar to the vehicle 10, where like elements are identified by the same reference number. The vehicle 40 illustrates the embodiment where all of the MIMO antennas are placed at some desired location in the vehicle. In this non-limiting example, several MIMO antennas are shown within the vehicle 40 to depict suitable locations for the MIMO antennas, including MIMO antennas 42 and 44 provided within the roof liner 14, antenna 46 under the seat 18, antenna 48 in the instrument panel 20, antenna 50 on or under the rear packaging shelf 22, and antenna 52 in the vehicle trunk 22. The number and location of the MIMO antennas for a particular vehicle is application specific in that any suitable number of the antennas can be provided at any suitable location that provides the desired data throughput. In this embodiment, one of the MIMO antennas 42-52, probably one of the MIMO antennas 42 or 44, will likely be selected as the primary antenna that will be used for the 2G/3G service.

As mentioned, the more the signals received by the two or more MIMO antennas are uncorrelated, the more data can be sent through the MIMO service at any particular point in time. As the signals are reflected from various structures between the transmitter (not shown) and the receiver 26 and as they constructively and destructively interfere with each other, the correlation between the signals received by the multiple MIMO antennas 42-52 increases or decreases. If the MIMO antennas 42-52 are farther apart with some diminishing return, then the signals become more uncorrelated increasing MIMO performance. Further, by placing the MIMO antennas 42-52 in the vehicle 40 the MIMO performance is more suitable since richer multipath signals are facilitated by the local scatter inherently present inside the vehicle 40.

Based on this discussion, it is clear that by placing the MIMO antennas in the vehicle 40 they can be spaced closer together than they could be when on the roof of the vehicle 40 and still provide the same throughput performance, or the MIMO antennas can be spaced farther apart for increased performance depending on the engineering and design requirements for the specific application.

As discussed above, one of the MIMO antennas would also be used for non-4G cellular communication services, such as the 2G and 3G services, which only require a single antenna. Because other cellular applications are often employed on vehicles, such as Onstar™, it may be desirable to keep the primary MIMO antenna element on the roof of the vehicle in, for example, the shark-fin module for those cellular applications because that will provide an increased range and lower data link cost.

Figure 4:
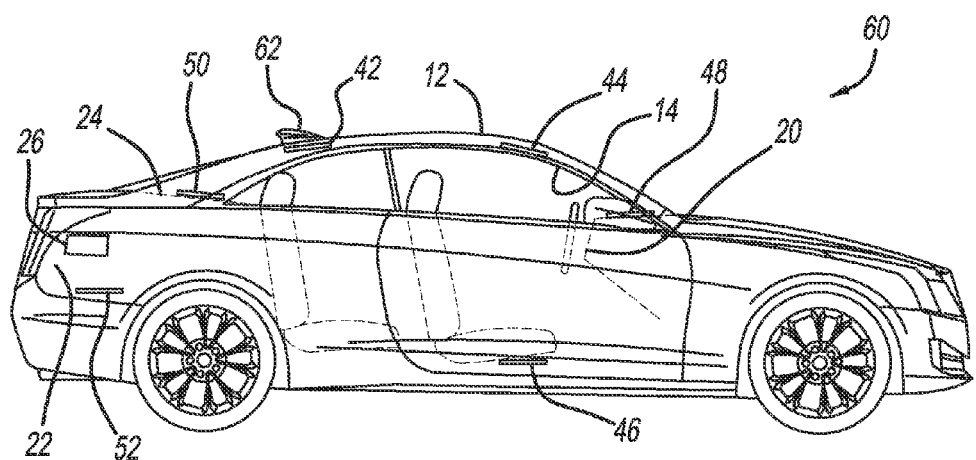
FIG. 4 is a side-view illustration of a vehicle including a primary MIMO antenna in a shark-fin roof mounted antenna module and secondary MIMO antennas within the vehicle.
Figure 5:
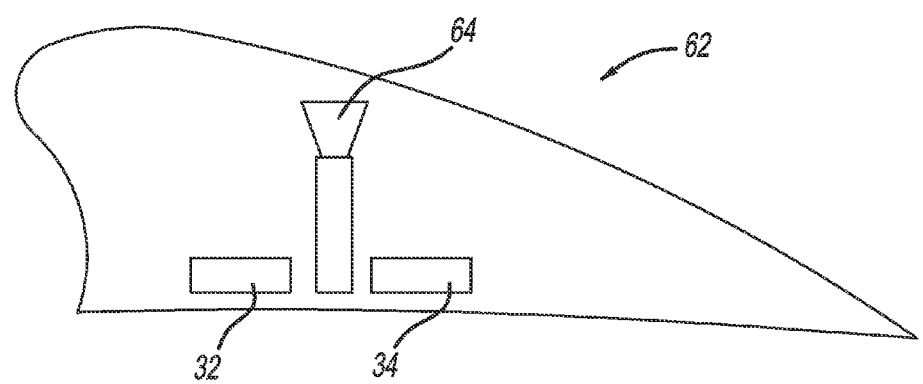
FIG. 5 is a side view illustration of the shark-fin antenna module shown in FIG. 4 separated from the vehicle.

FIG. 4 is a side-view illustration of a vehicle 60 similar to the vehicle 40, where like elements are defined by the same reference number. In this embodiment, the location of each of the antenna elements 42-52 discussed above are all one possible location for the one or more secondary antennas in an MIMO system. The vehicle 60 includes a shark-fin antenna module 62 mounted to the roof 12 of the vehicle 60 and shown separated from the vehicle 60 in FIG. 5. As above, the antenna module 62 includes the traditional antenna elements 32 and 34 for applications such as satellite radio, DSRC, etc., and includes a primary MIMO antenna 64. Thus, the primary MIMO antenna 64 can be used for non-4G cellular applications and can be used in combination with any one or more of the antennas 42-52 for 4G cellular applications.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A multi-input multi-output (MIMO) communications system for use in a vehicle having an enclosure, said system comprising:
    a plurality of MIMO antennas mounted to the vehicle where at least a first one of the MIMO antennas is within the enclosure of the vehicle, where the enclosure is a vehicle body structure consisting of a passenger compartment and a trunk of the vehicle; and
    a receiver receiving signals from the MIMO antennas.

2. The MIMO system according to claim 1 wherein another one of the MIMO antennas is mounted to an exterior structure of the vehicle.

3. The MIMO system according to claim 2 wherein said another one of the MIMO antennas is mounted to a roof of a vehicle.

4. The MIMO system according to claim 2 wherein said another one of the MIMO antennas is a primary MIMO antenna.

5. The MIMO system according to claim 4 wherein the primary MIMO antenna is mounted within a common antenna module with other non-MIMO antenna elements.

6. The MIMO system according to claim 5 wherein the antenna module is a shark-fin type antenna module.

7. The MIMO system according to claim 1 wherein all of the plurality of MIMO antennas are mounted within the enclosure of the vehicle.

8. The MIMO system according to claim 1 wherein the at least a first one of the MIMO antennas mounted within the enclosure is mounted in a roof liner of the vehicle.

9. The MIMO system according to claim 1 wherein the at least a first one of the MIMO antennas mounted within the enclosure is mounted to a seat of the vehicle.

10. The MIMO system according to claim 1 wherein the at least a first one of the MIMO antennas mounted within the enclosure is mounted in a trunk of the vehicle.

11. The MIMO system according to claim 1 wherein the at least a first one of the MIMO antennas mounted within the enclosure is mounted to a rear package shelf of the vehicle.

12. The MIMO system according to claim 1 wherein the at least a first one of the MIMO antennas mounted within the enclosure is mounted to an instrument panel of the vehicle.

13. The MIMO system according to claim 1 wherein the vehicle is an automobile.

14. The MIMO system according to claim 1 wherein the enclosure is a metal enclosure.

15. A multi-input multi-output (MIMO) communications system for use in a vehicle having an enclosure that provides 4G wireless cellular communications, said system comprising:
    a plurality of MIMO antennas mounted within the enclosure of the vehicle, where the enclosure is a vehicle body structure consisting of a passenger compartment and a trunk of the vehicle; and
    a receiver receiving signals from the MIMO antennas.

16. The MIMO system according to claim 15 wherein the plurality of MIMO antennas include a primary antenna that also provides 2G or 3G wireless cellular communications.

17. The MIMO system according to claim 16 wherein the plurality of MIMO antennas include one or more secondary antennas.

18. A multi-input multi-output (MIMO) communications system for use in a vehicle having an enclosure that provides 4G wireless cellular communications, said system comprising:
    a primary MIMO antenna mounted to a roof of the vehicle;
    one or more secondary MIMO antennas mounted within the enclosure of the vehicle, where the enclosure is a vehicle body structure consisting of a passenger compartment and a trunk of the vehicle; and
    a receiver receiving signals from the MIMO antennas.

19. The MIMO system according to claim 18 wherein the primary MIMO antenna is mounted within a common antenna module with other non-MIMO antenna elements.

20. The MIMO system according to claim 18 wherein the primary antenna also provides 2G or 3G wireless cellular communications.

* * * * *